(12) United States Patent
Oh

(10) Patent No.: US 12,222,052 B1
(45) Date of Patent: Feb. 11, 2025

(54) CORRUGATED PIPE CONNECTION DEVICE

(71) Applicant: Kofulso Co., Ltd., Seoul (KR)

(72) Inventor: Seung-il Oh, Seoul (KR)

(73) Assignee: KOFULSO CO., LTD, Seoul (KR)

( * ) Notice: Subject to any disclaimer, the term of this patent is extended or adjusted under 35 U.S.C. 154(b) by 0 days.

(21) Appl. No.: 18/377,020

(22) Filed: Oct. 5, 2023

(30) Foreign Application Priority Data

Aug. 8, 2023 (KR) .................. 10-2023-0103461

(51) Int. Cl.
*F16L 19/025* (2006.01)
*F16L 19/02* (2006.01)

(52) U.S. Cl.
CPC ......... *F16L 19/025* (2013.01); *F16L 19/0218* (2013.01)

(58) Field of Classification Search
CPC . F16L 19/025; F16L 19/0218; F16L 19/0286; F16L 19/043
USPC ....................................................... 285/903
See application file for complete search history.

(56) References Cited

U.S. PATENT DOCUMENTS

| | | | |
|---|---|---|---|
| 2,445,578 A * | 7/1948 | Howe ................. | F16L 19/0286 285/341 |
| 2,669,465 A * | 2/1954 | Newell ................ | F16L 25/023 285/334.3 |
| 3,338,597 A * | 8/1967 | Mason ................ | F16L 19/0286 285/107 |
| 3,346,274 A * | 10/1967 | Baron ................ | F16L 25/023 285/334.3 |
| 3,408,093 A * | 10/1968 | Epstein ............... | F16L 19/0218 285/52 |
| 3,501,171 A * | 3/1970 | Morton ................ | F16L 19/028 285/334.4 |
| 3,600,009 A * | 8/1971 | Shupper ............. | F16L 19/0218 285/226 |
| 3,614,137 A | 10/1971 | Jacobson | |
| 3,718,571 A | 2/1973 | Bidwell | |
| 3,753,888 A | 8/1973 | Alewitz | |
| 3,811,710 A | 5/1974 | Dula et al. | |
| 3,867,274 A | 2/1975 | Herman | |
| 4,060,472 A | 11/1977 | Alewitz | |
| 4,216,793 A | 8/1980 | Volgstadt et al. | |
| 4,282,175 A | 8/1981 | Volgstadt et al. | |
| 4,407,526 A | 10/1983 | Cicenas | |
| 4,487,432 A | 12/1984 | Passerell et al. | |
| 5,169,180 A | 12/1992 | Villoni et al. | |
| 6,422,606 B1 * | 7/2002 | Halstead ............ | F16L 19/0212 285/52 |

(Continued)

*Primary Examiner* — David Bochna
(74) *Attorney, Agent, or Firm* — Jacobson Holman PLLC

(57) ABSTRACT

A corrugated pipe connection device including: a corrugated stainless steel pipe; a straight pipe portion formed on each end of the corrugated stainless steel pipe; a connection member made of a metal and fitted to the outer periphery of the straight pipe portion; a synthetic resin sleeve fitted to the outer periphery of the straight pipe portion and having a flange; an expansion portion expanded from the end of the straight pipe portion; and a silicone packing having a ring portion coming into contact with the expansion portion, a protrusion portion protruding inwardly from the inner periphery of the ring portion to be inserted to the inside the straight pipe portion, and an insertion portion formed on the outer periphery thereof to surround the expansion portion therewith.

1 Claim, 1 Drawing Sheet

(56) References Cited

U.S. PATENT DOCUMENTS

2005/0093294 A1* 5/2005 Anselmo ............. F16L 19/0218
                                                    285/903
2011/0115220 A1* 5/2011 Kuo ..................... F16L 19/025
                                                    285/353

* cited by examiner

CORRUGATED PIPE CONNECTION DEVICE

CROSS REFERENCE TO RELATED APPLICATION OF THE DISCLOSURE

The present application claims the benefit of Korean Patent Application No. 10-2023-0103461 filed in the Korean Intellectual Property Office the entire contents of which are incorporated herein by reference.

BACKGROUND OF THE DISCLOSURE

Field of the Disclosure

The present disclosure relates to a corrugated pipe connection device that is capable of allowing an expansion portion expanded from the end of a straight pipe portion formed on each end of a corrugated stainless steel pipe to be insulated from dissimilar metal parts connected to the straight pipe portion by means of a connection member, thereby preventing galvanic corrosion from occurring.

Background of the Related Art

A corrugated stainless steel pipe used as a hot water pipe for a boiler is connected to dissimilar metal products (e.g., a brass pipe, a zinc-plated brass connection part, etc.).

When the corrugated stainless steel pipe is connected to the dissimilar metal products, if water flows through the corrugated stainless steel pipe, a potential difference occurs on a connected portion between the corrugated stainless steel pipe and the dissimilar metal, and in this case, a current of 1 to 2 mA is generated according to the temperature and state of the water. The current directly causes galvanic corrosion.

An expansion portion, which is expanded from the end of a straight pipe portion adapted to fit a connection member to the corrugated stainless steel pipe, is substantially weak regarding galvanic corrosion.

To solve such a problem, a conventional device is disclosed in U.S. Pat. No. 5,169,180 wherein a synthetic resin sleeve as an insulator, which is fitted to a corrugated pipe, has a flange adapted to allow an expansion portion expanded from the end of the corrugated pipe to be insulated from dissimilar metal products.

However, the above-mentioned conventional device is not perfect in water tightness between the flange and the dissimilar metal products, and accordingly, water may cause a failure in the prevention of galvanic corrosion from occurring on the expansion portion.

SUMMARY OF THE DISCLOSURE

Accordingly, the present disclosure has been made in view of the above-mentioned problems occurring in the related art, and it is an object of the present disclosure to provide a corrugated pipe connection device that is capable of allowing a straight pipe portion and an expansion portion of a corrugated stainless steel pipe, on which a potential electrical difference is generated, to be surrounded with a silicone packing, thereby preventing galvanic corrosion from occurring.

To accomplish the above-mentioned object, according to the present disclosure, there is provided a corrugated pipe connection device including: a corrugated stainless steel pipe; a straight pipe portion formed on each end of the corrugated stainless steel pipe; a connection member made of a metal and fitted to the outer periphery of the straight pipe portion; a synthetic resin sleeve fitted to the outer periphery of the straight pipe portion and having a flange; an expansion portion expanded from the end of the straight pipe portion; and a silicone packing having a ring portion coming into contact with the expansion portion, a protrusion portion protruding inwardly from the inner periphery of the ring portion to be inserted to the inside the straight pipe portion, and an insertion portion formed on the outer periphery thereof to surround the expansion portion therewith.

BRIEF DESCRIPTION OF THE DRAWINGS

The above and other objects, features and advantages of the present disclosure will be apparent from the following detailed description of the preferred embodiments of the disclosure in conjunction with the accompanying drawings, in which.

DETAILED DESCRIPTION OF THE PREFERRED EMBODIMENTS

Hereinafter, the present disclosure will be described in detail with reference to the accompanying drawings.

Figure 1:
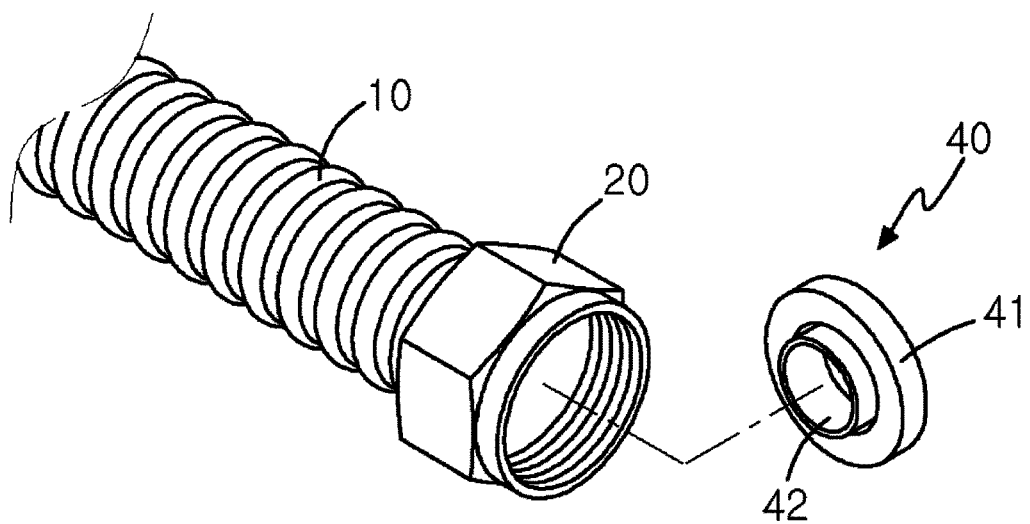
FIG. 1 is a perspective view showing a corrugated pipe connection device according to the present disclosure.
Figure 2:
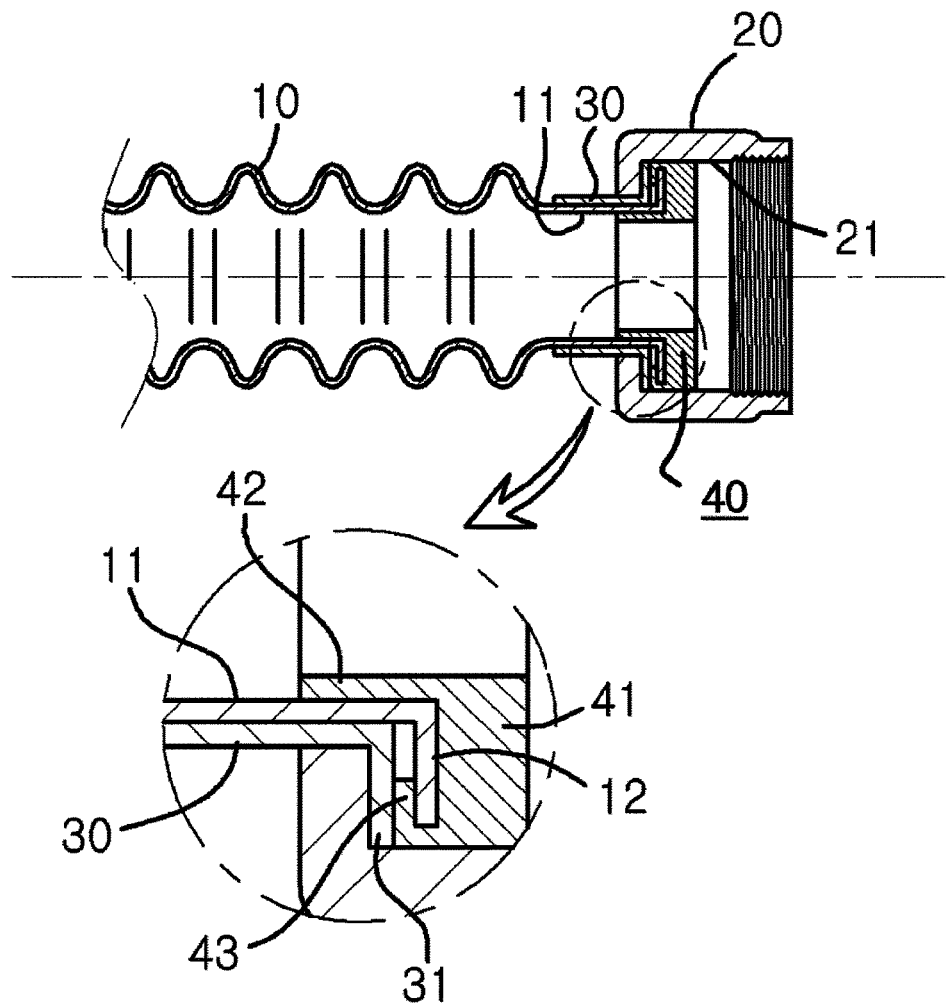
FIG. 2 is a sectional view showing the corrugated pipe connection device with an enlarged portion according to the present disclosure.

As shown in FIGS. 1 and 2, a corrugated pipe connection device according to the present disclosure includes: a corrugated stainless steel pipe 10; a straight pipe portion 11 formed on each end of the corrugated stainless steel pipe 10; a connection member 20 made of a metal and fitted to the outer periphery of the straight pipe portion 11; a synthetic resin sleeve 30 fitted to the outer periphery of the straight pipe portion 11 and having a flange 31; an expansion portion 12 expanded from the end of the straight pipe portion 11; and a silicone packing 40 having a ring portion 41 facingly coming into contact with the expansion portion 12, a protrusion portion 42 protruding inwardly from the inner periphery of the ring portion 41 to be inserted to the inside the straight pipe portion 11, and an insertion portion 43 formed on the outer periphery thereof to surround the expansion portion 12 therewith.

A coupling hole 21 of the connection member 20 passes through the ring portion 41 and is then locked onto the flange 31. If the connection member 20 is fastened to the other side connection part connected to the corrugated stainless steel pipe 10, the insertion portion 43 and the ring portion 41 coming into contact with the connection member 20 are pressurized to allow the expansion portion 12 to be insulatedly completely blocked from the outside, thereby preventing galvanic corrosion from occurring due to a micro current generated from a potential metal difference.

The flange 31 of the synthetic resin sleeve 30 serves to pressurize the insertion portion 43 of the silicone packing 40 when the connection member 20 is fastened.

The protrusion portion 42 is inserted to the inside of the straight pipe portion 11 to a depth in which the micro current does not have any influence on the expansion portion 12 and keeps water tightness, so that the protrusion portion 42 serves to prevent the galvanic corrosion from occurring on the expansion portion 12, together with the insertion portion 43.

Under the above-mentioned configuration, the metal connection member 20 and the synthetic resin sleeve 30 are fitted to the straight pipe portion 11 of the corrugated stainless steel pipe 10, and after the expansion portion 12 is formed on the end of the straight pipe portion 11, the protrusion portion 42 of the silicone packing 40 is fitted to the inner periphery of the corrugated stainless steel pipe 10. Next, the expansion portion 12 is coupled to the open insertion portion 43.

The protrusion portion 42 and the insertion portion 43 are made of a silicone material, and in this case, because they have small thicknesses, they have elastic forces sufficient to be open or turn over to surroundingly fit the expansion portion 12 thereto or return to their original shape.

As described above, the corrugated pipe connection device according to the present disclosure is configured to allow the expansion portion 12 made of the stainless steel subject to galvanic corrosion to be surroundedly coupled to the insertion portion 43 of the silicone packing 40 pressurized against the other side connection part and the connection member 20 connected to the corrugated stainless steel pipe 10, so that the expansion portion 12 is insulated from the other side of dissimilar metal connected to the corrugated stainless steel pipe 10, thereby preventing the galvanic corrosion from occurring.

While the present disclosure has been described with reference to the particular illustrative embodiments, it is not to be restricted by the embodiments but only by the appended claims. It is to be appreciated that those skilled in the art can change or modify the embodiments without departing from the scope and spirit of the present disclosure.

What is claimed is:

1. A corrugated pipe connection device comprising:
a corrugated stainless steel pipe;
a straight pipe portion formed on each end of the corrugated stainless steel pipe;
a connection member made of metal and fitted to the outer periphery of the straight pipe portion;
a synthetic resin sleeve fitted to the outer periphery of the straight pipe portion and having a flange;
an expansion portion expanded from the end of the straight pipe portion; and
a silicone packing having a ring portion in contact with the expansion portion, a protrusion portion protruding inwardly from the inner periphery of the ring portion to be inserted to the inside the straight pipe portion, and an insertion portion formed on the outer periphery of the ring portion to surround the expansion portion.

* * * * *